United States Patent Office 3,824,202
Patented July 16, 1974

3,824,202
HIGH TEMPERATURE POLYVINYL CHLORIDE
COMPOSITIONS
Edward L. White, Freehold, and Edward J. Augustyn,
Yardville, N.J., assignors to NL Industries, Inc., New
York, N.Y.
No Drawing. Filed Oct. 26, 1971, Ser. No. 192,630
Int. Cl. C08f 45/04, 45/38
U.S. Cl. 260—23 XA        9 Claims

ABSTRACT OF THE DISCLOSURE

A combination of components useful as additives in polyvinyl chloride resin compositions for producing thermoplastic compounds having superior resistance to chemical and physical degradation at high temperatures comprises a stabilizer, including one or more anti-oxidants, and an inert filler, the latter being selected from Group II–A metal sulfates. A flexible, heat resistant thermoplastic compound is prepared by adding the individual components separately, or optionally as a homogeneous mixture, hereinafter referred to as a stabilizer1filler additive, to a polyvinyl chloride resin of high molecular weight and a plasticizer of relatively low volatility.

BACKGROUND OF INVENTION

Thermoplastic polyvinyl chloride compounds are used extensively in the industry for producing flexible tubing, pipes, sheeting, tapes and the like and in particular as insulation on electric wires. In this latter capacity the thermoplastic compounds are frequently required to meet certain specifications of industrial groups such as automotive, communications, wire manufacturers and the like, and also certain regulatory groups such as Underwriters' Laboratories, with regard to chemical and/or physical degradation and in particular retention of tensile strength and elongation after aging at elevated temperatures. For example, polyvinyl chloride thermoplastic compounds presently used as insulation for electric wiring have been successful in meeting Underwriters' Laboratories specifications at temperatures as high as 105° C. Known commercially as 105° C. wire, this is currently the highest class of PVC thermoplastic insulation approved by U.L. However, there has been a steadily increasing demand in industry for polyvinyl chloride thermoplastic compounds that will resist chemical and/or physical degradation at temperatures above 105° C. and more especially over a much wider temperature range than has been possible using known thermoplastic compositions.

While some work has been done in this area with chlorosulfonated polyethylene thermoset materials and formulations utilizing cross-linked polyvinyl chlorides, these compositions present extrusion problems when cross linking is effected during extrusion; or require post-extrusion irradiation treatment.

SUMMARY OF THE INVENTION

The present invention is the discovery of a combination of stabilizer and filler, including one or more anti-oxidants, which combination of components, when incorporated into a particular vinyl chloride resin-plasticizer mix, will produce a flexible polyvinyl chloride thermoplastic composition which is easily extrudable, and will have physicals and in particular retention of tensile strength and elongation after aging which render it capable of meeting the specifications of many industrial groups and to surpass, for example, the U.L. specifications for 105° C. wire insulation.

The stabilizer used is selected to retard polyvinyl chloride dehydrochlorination and oxidation during high temperature, hereinafter referred to as lead-base stabilizers. As used herein this term will be understood to include lead compounds such as basic lead silicate, $$3PbO.2SiO_2.2H_2O;$$

tribasic lead sulfate, $3PbO, PbSO_4.H_2O$; basic lead chlorosilicate (a complex containing about 47% $SiO_2$ and 3% Cl); normal lead stearate $Pb(C_{17}H_{35}COO)_2$; dibasic lead stearate $2PbO.Pb(C_{17}H_{35}COO)_2$; a lead-barium complex known commercially as Mark 550 and sold by Argus Chemical Company; and modifications thereof such as for example a dibasic lead phthalate, a tribasic lead sulfate or a basic lead chlorosilicate having a coating comprising a barium salt of a fatty acid i.e. barium stearate as described in U.S. Pat. Nos. 3,106,539 and 2,847,145 respectively.

While the lead compounds enumerated above are acceptable stabilizers for many applications the modified stabilizers referred to above i.e. the dibasic lead phthalate, tribasic lead sulfate and the basic lead chlorosilicate coated with a barium stearate are the preferred stabilizers for use in forming the improved PVC thermoplastic compound of this invention. In particular the modified basic lead chlorosilicate complex, hereinafter identified for brevity as MPC-S, is especially suitable being highly effective when added at a level of 5–15 parts per 100 parts resin in plasticizer systems that are reactive or non-reactive with high basicity compounds. The modified tribasic lead sulfate i.e. MPS, is preferred at similar levels for less reactive plasticizer systems while the modified dibasic lead phthalate (MDPT) is preferred for plasticizer systems of intermediate reactivity.

In addition to the lead-base stabilizers certain non-lead stabilizers have been used successfully in the preparation of the flexible PVC thermoplastic compound of this invention; in particular, organo-tin-compounds such as dibutyl tin-bis-isooctyl thioglycolate and certain barium-cadmium complexes such as Mark OHM, manufactured by Argus Chemical Company. Of these non-lead stabilizers the organo-tin compounds are usually added at levels of from 2–5 parts per 100 parts resin and the barium-cadmium compounds at levels of from 5 to 10 parts per 100 parts resin.

Concurrently with the discovery that only polyvinyl chloride resins of relatively high molecular weight i.e. having an inherent viscosity of at least 1.1, together with plasticizers of low volatility i.e. having vapor pressures at least as low as 0.20 dynes/cm.$^2$ at 160° C. may be used in formulating the relatively high temperature thermoplastic material of this invention—was the discovery that only a certain class of fillers may be used. In general the function of a filler is to fill the polyvinyl chloride polymer matrix so as to provide satisfactory resistance to load deformation and penetration (in the case of wire insulation) without reducing the retention of elongation after aging below acceptable limits. Many different kinds of fillers such as for example talc, calcium carbonate, coated clays and the like have been used heretofore for imparting these properties to PVC thermoplastic compounds designed for moderately high temperature (105° C.) use. However, it was found that, if used in amounts sufficient to insure satisfactory resistance to load deformation and penetration at elevated temperatures i.e. temperatures above 105° C., these conventional fillers lowered the percent retention of elongation after aging below acceptable levels. It has now been found that fillers capable of imparting optimum resistance to deformation and penetration under load together with satisfactory retention of elongation after aging are Group II–A metal sulfates and in particular barium sulfate, although substantially equivalent results were obtained with strontium, magnesium and calcium sulfates at load levels of from 40 to 90 parts per 100 parts resin.

An exception to the necessity for using Group II–A metal sulfates as fillers is the case where a PVC thermoplastic wire insulation need not have both high resistance to penetration and retention of elongation at elevated temperatures as for example when the insulation is used as the inner extrudate on a conductor having protective jacketing of one kind or another, as used in the art. In this case no filler or low levels of filler may be used.

An additional component to be included with the stabilizers and fillers of this invention is an anti-oxidant which serves to minimize plasticizer and polyvinyl chloride resin oxidation during high temperature processing and subsequent aging; and in this capacity may also be considered a stabilizer. In general phenolic-type anti-oxidants are used in the stabilization of vinyl chloride compounds one of the more commonly used anti-oxidants, because of its relatively low cost, being 2,2'-bis (4 hydroxy phenyl) propane (BPA). This may be used either alone or in combination with other anti-oxidants such as di-esters of thio-dipropionic acid and in particular dilaurylthiodipropionate (DLTDP). When used alone the (BPA) may be used in amounts of from 0.5 to 2 parts per 100 parts resin; and the (DLTDP) in amounts from 0.5 to 2.0 phr. When used in combination the range is from 0.5 to 4 parts per 100 parts resin, the preferred ratio being one part (BPA) to 2 parts (DLTDP).

The stabilizer filler and anti-oxidant may be mixed together in predetermined amounts, as for example by dry blending, to form a homogeneous mixture, sometimes referred to as a stabilizer-filler additive, which may be packaged and sold to plastic manufacturers for producing the flexible thermoplastic polyvinyl chloride compound of this invention; or the individual components may be added separately to a resin-plasticizer mix.

As mentioned above the plasticizers used are those characterized by low volatility as measured by vapor pressures at elevated temperatures and in this connection a large number of plasticizers were tested both as to their vapor pressures alone and as components of 20 mil molded slabs of PVC thermoplastic material. Identification of the plasticizers tested and the resulting data relative to vapor pressures and the effect of the plasticizer in the retention of elongation after aging of the PVC thermoplastic compounds are shown in Table I below.

TABLE I.—VAPOR PRESSURE CRITERIA FOR PLASTICIZERS, 158° C.

| Plasticizer | Vapor pressure,[a] dynes/cm.$^2$ | Plas. loss,[b] percent | Reten. elong.[b] percent |
|---|---|---|---|
| Di-2-ethylhexyl phthalate | 10 | | |
| Di-tridecyl phthalate | 1.55 | 121.0 | 4 |
| Polyester (low mol. wt.) | 4.8 | 46.3 | 13 |
| Tri 2 ethylhexyl trimellitate | 3×10$^{-1}$ | 64.8 | 15 |
| Polyester-A (MMP) (med. mol. wt.) | 2.2×10$^{-1}$ | 26.2 | 46 |
| Dipentaerythritol ester (PE) | 1.7×10$^{-2}$ | 14.6 | 65 |
| Polyester-B (MMPP) (med. mol. wt.) | 5.6×10$^{-2}$ | 12.3 | 71 |
| Tri-n-octyl/n-decyl trimellitate | 9×10$^{-2}$ | 17.8 | 77 |
| Polyester (HMP) (high mol. wt.) | 9×10$^{-3}$ | 10.4 | 80 |
| Polysebacate (HMPs) (high mol. wt.) | 7.8×10$^{-3}$ | 10.3 | 96 |

[a] Determined on plasticizer alone.
[b] Determined on 20 mil molded slab specimen after 7 days 158° C. aging; Formulation PVC i.v.=1.3+ (100); Plasticizer (50), MPC-S (10), BPA (1), DLTDP (2), Ba(SO$_4$) (60).

As seen from the previous table the low volatility plasticizers having a vapor pressure no higher than about 0.2 dynes/cm.$^2$ include, for example, mixed normal alkyl trimellitate (NTM) manufactured by Hooker Chemical Company, a dipentaerythritol ester (PE) known as Hercoflex 707 and manufactured by Hercules Chemical Company; a medium molecular weight polyester (MMPP) known as Santicizer 409 and manufactured by Monsanto Chemical Company; a high molecular weight polyester (HMP) known as Emery 9789 and manufactured by Emery Industries and a high molecular weight polysebacate (HMPs) known as Paraplex G-25 and sold by Rohm and Haas Company. Formulation levels of from 40 to 60 and preferably about 50 parts per 100 parts resin have been found to be most effective in developing retention of elongation after aging of about 50% coupled with resistance to deformation or penetration under load.

DESCRIPTION OF PREFERRED EMBODIMENT

The high temperature polyvinyl chloride thermoplastic compounds of this invention are preferably those that embody a stabilizer-filler additive comprising a stabilizer selected from the group consisting of lead-base stabilizers, organo-tin compounds and certain lead-barium and barium-cadmium complexes in combination with Group II–A metal sulfates, and an anti-oxidant such as a 2-2'-bis (4 hydroxy phenyl) propane either alone or in combination with dilaurylthiodipropionate.

A typical additive is given below:

| Composition X | Amount (percent) |
|---|---|
| Stabilizer-modified lead chlorosilicate | 13.5 |
| Filler-barium sulfate | 82.0 |
| Anti-oxidants: | |
| 2,2'-bis (4 hydroxy phenyl) propane | 1.5 |
| Dilaurylthiodipropionate | 3.0 |

Modifications of the above composition, hereinafter identified as compositions Y and Z respectively, may include substitution of a modified tribasic lead sulfate or a dibasic lead phthalate for the modified lead chlorosilicate, and in substantially the same amounts.

The several components of these stabilizer-filler additives may be mixed together in any suitable manner as for example by dry blending. The homogeneous product is an off-white, dry, powdery material and may be added in this form to a PVC resin and plasticizer mix. Optionally the individual components i.e. the stabilizer, filler and anti-oxidants may be added separately. Moreover, other components such as lubricants and the like may be added at any convenient point in the production of the thermoplastic compound.

As pointed out above the invention contemplates the use of other lead-base stabilizers as well as, lead-barium, barium-cadmium and organo-tin compounds. These, together with other Group II–A metal sulfate fillers are illustrated in the examples below.

There is, of course, no universal stabilizer for PVC plastics and different lead-base stabilizers offer particular advantages when combined with specific plasticizers. Stabilizer-plasticizer interaction due to reactivity of these components at varying temperatures make the formulation of a polyvinyl chloride thermoplastic composition an empirical art. Retention of elongation after aging is dependent upon the aging characteristics (thermal stability) of the resin, the thermal stability characteristics of the plasticizer used, the efficiency of the stabilizer and the stabilizer-plasticizer interaction; while penetration resistance depends upon thermal deformation characteristics of the resin, and the level and type of plasticizer and filler used. In general higher filler loadings improve resistance to penetration. However, as pointed out above it was found, quite unexpectedly, that when using conventional fillers i.e. magnesium silicate, aluminum silicate, whiting and the like, retention of elongation after aging at elevated temperatures fell far below acceptable levels. However, as the result of extensive experimentation it has now been found that the requirements for penetration resistance together with retention of elongation after aging at elevated temperatures can be met by the use of a relatively limited number of fillers and in particular Group II–A metal sulfates in combination with a stabilizer, anti-oxidants, a relatively non-volatile plasticizer and a polyvinyl chloride resin having a high or ultra high molecular weight. For future reference molecular weight will be expressed in terms of the inherent viscosity (i.v.) of the PVC as determined by ASTM; D–1243, Method A.

The preparation of the polyvinyl chloride thermoplastic insulation of this invention may be carried out by a relatively simple physical blending procedure wherein the polyvinyl chloride homopolymer resin is charged into suitable dry blending equipment, such as for example a Henschel blender, heated to about 130° F. and followed by rapid addition of the selected plasticizer. The temperature of the mixture is brought to about 190° F. for about one minute whereupon the components of the stabilizer-filler additive specified above plus antimony trioxide and stearic acid are added to the mix. After about 1.5 minutes or when the temperature of the mixture reaches about 230° F. the mixture is discharged from the blender. This dry blend may be used as such to prepare sheeting, tapes and the like using conventional methods; or optionally may be pelletized or otherwise formed into suitable shapes for feeding to wire extrusion equipment.

With reference to the aforesaid physicals, these are those physical properties of a thermoplastic material for which it is most frequently tested in determining its acceptability by the standrads of various industrial groups or by a regulatory group such as Underwriters' Laboratories. Among other things the latter group provides tests for thermoplastic wire insulation at elevated temperatures.

The tests used in determing the physicals of the PVC thermoplastic compounds of this invention are modifications of U.L.'s 105° C. tests in that in most instances the test specimens used were 20 mil slabs of PVC thermoplastic instead of U.L.'s 31 mil wire extrudate; and the temperature used in the aging tests was 158° C. instead of U.L.'s 136° C. Because of the relatively high temperature used in these modified tests, test specimens having the physicals hereinafter specified are referred to as having a 125° C. rating. It will be understood that this is an arbitrary rating and not necessarily a U.L. rating.

TESTS

Tensile strength and elongation

The tensile strength and elongation of the 20 mil slabs (0.020" thick) or $\frac{1}{32}$ inch wire insulation are determined on each specimen after aging in a force-draft oven for 7 days at 158° C. For comparison corresponding specimens that have not been oven-aged shall be subjected to tensile-strength and elongation tests at the same time as the aged specimens are tested.

The values of tensile strength and elongation of specimens after aging shall be at least 70% and 50% respectively of the values obtained on the unaged specimens.

Penetration test at rated temperature

Underwriters' Laboratories is concerned with thermal deformation of end-products and specifically insulated wires. In this connection they specify construction details for given application areas. With reference to a penetration test they specify that the test shall be conducted on $\frac{1}{32}$ inch wire insulation on a No. 20 AWG ($\frac{1}{32}$ inch) copper conductor in accordance with U.L. Bulletin 758. However, for more general laboratory utility to characterize various compositions a modified test may be employed wherein the properties of flat slab specimens are evaluated.

Thus, for example when testing the PVC thermoplastic compound of this invention as wire insulation, test specimens shall be preheated five minutes at a temperature of 125° C. in a circulating oven prior to testing. Immediately before testing the oven blower motor shall be shut off to insure that the system is vibration-free.

The samples of insulated wire shall be placed under and at right angles to the cutting edge of a weighted metal plunger having a sharp, 90-degree "V" edge and held in a vertical position by means of a suitable guide. The total applied load including the weight and plunger shall be 350 grams. The time required for the plunger to cut through the insulation of the wire and make contact with the conductor shall be measured by means of a stop watch; and contact with the conductor shall be indicated by means of a buzzer assembly energized from a D.C. source.

In the modified tests, not U.L. tests, wherein the test specimens are slab specimens 20 mils in thickness the slabs shall be sandwiched between the plunger tip and a $\frac{1}{32}$ inch conductor to simulate wire insulation appearance. The pretest conditioning, applied load and test cycle are performed in a manner identical to that for the wire specimens.

In each of the above described test procedures the time for cut-through is a measure of penetration resistance of thermoplastic compositions.

Insulation resistance

Fifty foot samples of the insulated wire shall be placed in an air oven at specified test temperature. The insulation resistance shall be measured after 24 hours and after seven days at test temperature.

Deformation

Test as described in Underwriters' Laboratories, UL–62—1968; Flexible Cord and Fixture Wire Deformation Test pg. 79–71; modified to include a load of 500 grams for $\frac{1}{32}$ inch insulation on No. 20 AWG Wire.

PERFORMANCE RATING

Using the foregoing tests for testing the PVC thermoplastic compounds of this invention those compounds characterized by physicals meeting the following minimum requirements are deemed to have a performance rating arbitrarily defined as a 125° C. rating.

Tensile Strength, p.s.i.—orig. _____ 1500
Percent retention after aging for 7 days at 158° C. _____ 70
Elongation—percent orig. _____ 100
Percent retention after aging for 7 days at 158° C. _____ 50

The invention is further described and illustrated by the following examples.

EXAMPLES I–XII

Using the method hereinabove described a series of twelve PVC thermoplastic compounds were prepared to illustrate the necessity for using polyvinyl chloride resins having inherent viscosities greater than 1.1 in combination with plasticizers having vapor pressures not greater than 0.2 dynes/cm.$^2$ at 160° C. in order to produce compounds having a 125° C. performance rating. In formulating these compounds the components of a stabilizer-filler additive, as exemplified by Compositions X and Y supra were used.

The twelve formulations are shown in Table II below the amounts of the components used being expressed on a parts per 100 parts resin basis (phr.). The dry mixed components were heated and processed into sheet form on a 2 roll mill at a temperature of 350° C. These sheets were then compression molded into 20 mil slabs and the several slabs were tested using the tests described above.

Included also in Table II are the performance ratings of the polyvinyl chloride thermoplastic slabs prepared from these formulations. It will be seen from Examples I–VI and XI that test specimens prepared using a combination of PVC resin having an inherent viscosity above about 1.1 and a plasticizer having a vapor pressure no higher than about 0.2 dynes/cm.$^2$ and 160° C. had percent retention of tensile strength above 70 and percent retention of elongation above 50; whereas in Example VII in which the PVC resin had an inherent viscosity below 1.1 the percent retention of elongation dropped to 46. In Example VIII the PVC resin had a high inherent viscosity (1.3+) but the plasticizer had a vapor pressure above 0.2 dynes/cm.$^2$ (see Table I above) and both the percent retention of tensile strength and elongation were below the acceptable minimums. In Examples IX and X PVC resins of high inherent viscosity were used in combination with plasticizers of relatively high vapor pressure and again the percent retention of elongations after aging were below 50.

The foregoing specimens were all prepared using the same stabilizer-filler additive in which the stabilizer was a modified lead chlorosilicate. The test specimen of Example XII differed in that the stabilizer was a modified lead sulfate. When this additive was used in combination with a high molecular weight PVC resin and a plasticizer of low volatility the percent retention of tensile strength and percent retention of elongation after aging were well above the selected minimums for a PVC thermoplastic compound having a 125° C° rating.

EXAMPLES XIII–XVI

As pointed out above while normal and basic lead stabilizers used in combination with high molecular weight PVC resins and plasticizers having exceptionally low vapor pressures insure thermoplastic compounds having excellent retention of tensile strength and elongation after aging—and are preferred from a cost standpoint—other stabilizers may be used and in particular the barium-cadmium and lead barium complexes identified above and an organo tin stabilizer i.e. di butyl tin bis isooctyl thioglycolate. To compare the use of lead-base and non lead-base stabilizers four 20 mil test specimens were prepared as hereinabove described using the same high molecular weight PVC resin, the same plasticizer, in this case NTM, the same filler i.e. $BaSO_4$ and various stabilizers. The several formulations are shown in Table III below together with the performance ratings of the respective thermoplastic compounds prepared therefrom. From this table it will be seen that formulations utilizing the non-lead base stabilizers i.e. the barium-cadmium complex, of Example XIV and the di butyl tin-bis isooctyl thioglycolate of Example XVI each had a percent retention of tensile strength and a percent retention of elongation above the arbitrarily selected minimum values for a 125° C. performance rating; and were comparable to the ratings of the lead-base stabilizer (MPC–S) of Example XIII.

EXAMPLES XVII–XX

An additional series of 20 mil test specimens were prepared according to the formulations shown in Examples XVII–XX in Table IV for the purpose of illustrating the effect of variations of the anti-oxidants used. In each of these examples the same combination of high molecular weight PVC resin, low vapor pressure plasticizer and filler ($BaSO_4$) were used in formulating the thermoplastic compounds, the only variations being in the use of one or more anti-oxidants and the amounts of each. Thus in Example XVII no anti-oxidants were used while in Example XVIII only the DLTDP was used in an amount of one part; in Example XIX both BPA and DLTDP were used in equal amounts i.e. one part; and in Example XX one part of BPA was used to 2 parts DLTDP. Referring to the performance ratings it will be seen that each thermoplastic compound had a percent retention of tensile strength and elongation above the selected minimum for a 125° C. rating and that the 20 mil test specimens prepared from a blend of BPA and DLTDP had optimum performance ratings.

EXAMPLES XXI–XXX

To illustrate the criticality of Group II-A fillers as compared to conventional fillers a series of ten 20 mil test panels were prepared in the manner hereinabove described using the PVC thermoplastic formulations shown in Table IV. In each example the same combination of high molecular weight PVC resin, low vapor pressure plasticizer and modified lead chloro-silicate stabilizer was used in conjunction with either one or two anti-oxidants as the case may be. The Group II-A fillers included barium sulfate, strontium sulfate, magnesium sulfate and calcium sulfate. The conventional fillers included No. 33 clay (anhydrous aluminum silicate), magnesium silicate, a surface treated calcium carbonate, whiting ($CaCO_3$) and a composite $TiO_2$ pigment (70% $CaSO_4$/30% $TiO_2$).

The several test specimens were tested for performance using the tests described above. As shown in the Table only the formulations utilizing the Group II-A metal sulfate salts were capable of satisfying the selected minimum retention of elongation after aging. The formulations including the more commonly used clay, talc or calcium carbonate fillers gave thermoplastic compounds having unsatisfactory performance ratings.

EXAMPLES XXXI–XXXVI

Additional formulations of PVC resin, plasticizer, filler and stabilizer were prepared to illustrate modifications of the amounts and kinds of plasticizers and fillers used. These formulations are shown in Table V. Each formulation employed the same high molecular weight PVC resin, the same stabilizer in equal amounts and the same combination of anti-oxidants. 20 mil slab test specimens were prepared in the manner hereinabove described and tested for their performance. Included in the tests was a penetration resistance test.

From the performance data included in Table V it will be seen that within the variations of filler and plasticizer used each formulation produced a PVC thermoplastic compound capable of meeting the selected minimums for retention of tensile strength and elongation after aging; and that the data on penetration resistance shows these compounds resisted cut-through for at least 8 minutes.

EXAMPLES XXXVII–XLI

All of the foregoing examples illustrate the superior aging properties of the PVC thermoplastic compounds of this invention when tested in the form of 20 mil slabs. However, the present invention has also been applied to extruded wire insulation wherein identical compounds have been formulated to produce polyvinyl chloride thermoplastic electrical insulations characterized by excellent retention of physicals after aging as well as electrical properties and resistance to deformation under load at elevated emperatures.

The several formulations employed are shown in Table VI below. These were mixed together in the manner hereinabove described, using standard commercial dry blending procedures. The dry mixes were in the one case, pelletized or otherwise formed into suitable shapes for extrusion in a wire coating process; and in the other case made up into 20 mil slabs as hereinabove described.

Referring to the Table, formulation XXXVII employed a moderately high molecular weight polyvinyl chloride resin in combination with a low volatility plasticizer (NTM) and the components of the stabilizer-filler additive (X) identified above. Example XXXVIII is a similar to Example XXXVII but utilized a different low volatility plasticizer i.e. dipentaerythritol ester. In Example XXXIX a high molecular weight PVC resin was used in combination with the components of the stabilizer-filler additive (X) and a medium molecular weight polyester plasticizer.

Formulation XL is substantially identical to formulation XXXIX but omits the anti-oxidant DLTDP while formulation XLI, which combines a medium molecular weight PVC resin with a relatively low amount of anti-oxidant (BPA) and a clay filler, is typical of a PVC thermoplastic compound known to be capable of satisfying Underwriter Laboratories' specifications for 105° C. rated wire insulation.

Each of the above specimens i.e. the extruded insulations and the 20 mil slabs were tested for performance ratings, using the tests described above. The performance ratings are tabulated in Table VII below from which it may be seen that formulations XXXVII through XL produced 1/32 inch extruded wire insulation on a No. 20 AWG copper conductor and 20 mil slab specimens both of which had percent retention of elongation after aging exceeding the selected minimum (50%) for a 125° C. rated PVC thermoplastic material. Also, when subjected to the appropriate penetration tests for wire insulation and slab, respectively, the wire insulation had a penetration resistance greater than 10 min. and the slab had comparable high resistance to penetration.

However, formulation XLI, which produced a PVC thermoplastic material having a 105° C. by U.L.'s rating, failed to meet the selected performance ratings for 125° C. PVC thermoplastic both with respect to penetration resistance and percent retention of elongation after aging.

EXAMPLES XLII–XLVII

The foregoing description and examples relate, in particular, to filled, flexible polyvinyl chloride thermoplastic compounds which, among other physicals are characterized by a high resistance to deformation and penetration or cut-through at high temperatures i.e. >105° C. in combination with a percent retention of elongation after aging of at least 50%. Penetration resistance is especially desirable in wire insulation in that it is a measure of the resistance of the insulation to physical deformation or destruction which may be caused, among other things, by friction between physically contacting insulations or metal surfaces, by momentary contact with a hot object such as a soldering iron, by penetration by a sharp object and the like. The foregoing contingencies presuppose the use of the PVC insulation as the only coating on the wire conductor.

However, there may be applications wherein a conductor has an inner primary coating of insulation protected by an outer protective jacketing material. Hence the primary insulation may not be required to satisfy the above described resistance to load deformation tests. Other specific applications in which load deformation tests may be waived are in the use of thin-walled electrical insulations or adhesive tapes. Such being the case modifications of the formulations described above may be used and are contemplated within the scope of the invention wherein the filler component is omitted or markedly reduced.

Typical formulations for preparing unfilled PVC thermoplastic compounds are given in Table VIII below. Each formulation comprises a high or ultra high molecular weight PVC resin in combination with a lead-base or organo-tin compound, a low volatility plasticizer and one or more anti-oxidants. 5 mil and 20 mil slabs were prepared from these formulations in the manner described above, and tested using the above described aging tests. As shown in the table each test specimen had satisfactory percent retention of tensile strength and elongation for use as high temperature insulation. Moreover it should be noted that even when the extremely thin slabs (5 mils) were subjected to the above described tests they exhibited outstanding retention of physicals after aging at elevated temperatures. Such physical properties in extremely thin PVC thermoplastic sheeting, wire insulation and the like are highly desirable in certain applications such as the insulated wires used in computers and business machines, and the magnetic wire insulation for motors where high environmental ambient temperatures are encountered.

TABLE II.—PVC THERMOPLASTIC FORMULATIONS, p.h.r.
(Variables—resins and plasticizers)

| | I | II | III | IV | V | VI | VII | VIII | IX | X | XI | XII |
|---|---|---|---|---|---|---|---|---|---|---|---|---|
| Components: | | | | | | | | | | | | |
| PVC resin: | | | | | | | | | | | | |
| (i.v.=1.3+) | 100 | 100 | 100 | | | | | 100 | 100 | 100 | 100 | 100 |
| (i.v.=1.2–1.3) | | | | 100 | | | | | | | | |
| (i.v.=1.1.–1.2) | | | | | 100 | 100 | | | | | | |
| (i.v.=1.0–1.1) | | | | | | | 100 | | | | | |
| Plasticizer: | | | | | | | | | | | | |
| NTM | 50 | | | | 50 | | | | | | | 50 |
| DPE | | 50 | | | | | | | | | | |
| MMPP | | | 50 | 50 | | 50 | 50 | | | | | |
| DTDP | | | | | | | | | | | | |
| MMP | | | | | | | | 50 | | | | |
| TEM | | | | | | | | | 50 | | | |
| HMP | | | | | | | | | | 50 | | |
| | | | | | | | | | | | 50 | |
| Stabilizer: | | | | | | | | | | | | |
| MPC-S | 10 | 10 | 10 | 10 | 10 | 10 | 10 | 10 | 10 | 10 | 10 | |
| MPS | | | | | | | | | | | | 10 |
| Anti-oxidants: | | | | | | | | | | | | |
| BPA | 1 | 1 | 1 | 1 | 1 | 1 | 1 | 1 | 1 | 1 | 1 | 1 |
| DLTDP | 2 | 2 | 2 | 2 | 2 | 2 | 2 | 2 | 2 | 2 | 2 | 2 |
| Filler: (BaSO4) | 60 | 60 | 60 | 60 | 60 | 60 | 60 | 60 | 60 | 60 | 60 | 60 |
| Performance [1] | | | | | | | | | | | | |
| Physicals: | | | | | | | | | | | | |
| Tensile strength (p.s.i.) orig | 3,295 | 3,283 | 3,300 | 3,090 | 3,160 | 3,040 | 3,243 | 3,203 | 3,260 | 3,120 | 3,057 | 3,170 |
| Percent retention [2] | 83 | 79 | 78 | 76 | 81 | 82 | 76 | 21 | 89 | 101 | 92 | 98 |
| Elongation (percent) orig | 288 | 287 | 262 | 303 | 287 | 265 | 280 | 285 | 262 | 292 | 233 | 285 |
| Percent retention [2] | 62 | 65 | 71 | 50 | 55 | 62 | 46 | 4 | 46 | 15 | 30 | 81 |

[1] Tested as 20 mil. slab specimens.
[2] Retention after aging 7 days at 158° C.

TEM=Morflex 510 (tri 2-ethylhexyl trimellitate), manufactured by Pfizer Chemicals.
HMP=Emery 9789 (High Molecular weight polyester), manufactured by Emery Industries.

TABLE III.—PVC THERMOPLASTIC FORMULATION, p.h.r.

(Variables—stabilizers and anti-oxidants)

| | XIII | XIV | XV | XVI | XVII | XVIII | XIX | XX |
|---|---|---|---|---|---|---|---|---|
| Components: | | | | | | | | |
| PVC resin: (i.v.=1.3+) | 100 | 100 | 100 | 100 | 100 | 100 | 100 | 100 |
| Plasticizer: | | | | | | | | |
| NTM | 50 | 50 | 50 | 50 | | | | |
| MMPP | | | | | 50 | 50 | 50 | 50 |
| Stabilizer: | | | | | | | | |
| MPC-S | | 10 | | | 10 | 10 | 10 | 10 |
| B-C | | | 5 | | | | | |
| P-B | | | | 10 | | | | |
| D-BST | | | | | | 5 | | |
| Anti-oxidants: | | | | | | | | |
| BPA | 1 | 1 | 1 | 1 | | | 1 | 1 |
| DLTDP | 2 | 2 | 2 | 2 | | 1 | 1 | 2 |
| Filler: BaSO$_4$ | 60 | 60 | 60 | 60 | 60 | 60 | 60 | 60 |

Performance [1]

| Physicals: | | | | | | | | |
|---|---|---|---|---|---|---|---|---|
| Tensile strength (p.s.i.) orig | 3,300 | 3,443 | 3,000 | 3,333 | 3,370 | 3,280 | 3,183 | 3,363 |
| Percent retention [2] | 91 | 92 | 100 | 96 | 76 | 76 | 82 | 78 |
| Elongation (percent) orig | 277 | 310 | 270 | 283 | 225 | 258 | 258 | 265 |
| Percent retention [2] | 73 | 56 | 63 | 80 | 58 | 62 | 67 | 72 |

[1] Tests performed on 20 mil slabs.  [2] Retention after aging 7 days at 158° C.

P-B = Mark 550 (lead-barium complex), mfg. by Argus Chem. Co.
B-C = Mark OHM (barium-cadmium complex), Ibid.
D-BST = Thermolite 31 (dibutyl tin-bis-isooctyl thioglycolate), mfg. by M & T Chemical Co.

TABLE IV.—PVC THERMOPLASTIC FORMULATIONS, p.h.r.

(Variables—fillers)

| | XXI | XXII | XXIII | XXIV | XXV | XXVI | XXVII | XXVIII | XXIX | XXX |
|---|---|---|---|---|---|---|---|---|---|---|
| Components: | | | | | | | | | | |
| PVC resin: (i.v.=1.3+) | 100 | 100 | 100 | 100 | 100 | 100 | 100 | 100 | 100 | 100 |
| Stabilizer: MPC-S | 10 | 10 | 10 | 10 | 10 | 10 | 10 | 10 | 10 | 10 |
| Plasticizer: NTM | 50 | 50 | 50 | 50 | 50 | 50 | 50 | 50 | 50 | 50 |
| Anti-oxidants: | | | | | | | | | | |
| BPA | 1 | 1 | 1 | 1 | 1 | 1 | 1 | 1 | 1 | 1 |
| DLTDP | | | | | | 2 | 2 | | 2 | 2 |
| Fillers: | | | | | | | | | | |
| BaSO$_4$ | 60 | | | | | | | | 60 | |
| SrSO$_4$ | | 60 | | | | | | | | |
| MgSO$_4$·7H$_2$O | | | 60 | | | | | | | |
| CaSO$_4$ | | | | 60 | | | | | | |
| Anhydrous aluminum silicate | | | | | 60 | | | | | |
| MgSiO$_2$ | | | | | | 60 | | | | |
| CaCO$_3$ (surface treated) | | | | | | | 60 | | | |
| CaCO$_3$ (whiting-surface treated) | | | | | | | | 80 | | |
| CaSO$_4$/TiO$_2$ (70/30) | | | | | | | | | | 60 |

Performance [1]

| Physicals: | | | | | | | | | | |
|---|---|---|---|---|---|---|---|---|---|---|
| Tensile strength (p.s.i.) orig | 3,267 | 2,803 | 2,657 | 3,237 | 2,733 | 2,730 | 2,450 | 2,177 | 3,327 | 3,330 |
| Percent retention [2] | 92 | 93 | 102 | 93 | 164 | 119 | 132 | 118 | 86 | 88 |
| Elongation (percent) orig | 247 | 210 | 170 | 250 | 134 | 210 | 170 | 200 | 247 | 262 |
| Percent retention [2] | 62 | 54 | 51 | 50 | 30 | 31 | 7 | 15 | 69 | 54 |

[1] Test performed on 20 mil slab specimens.  [2] Retention after aging 7 days at 158° C.

TABLE V.—PVC THERMOPLASTIC FORMULATIONS, p.h.r.

(Variables—filler/plasticizer ratios)

| | XXXI | XXXII | XXXIII | XXXIV | XXXV | XXXVI |
|---|---|---|---|---|---|---|
| Components: | | | | | | |
| PVC resin: i.v.=1.3+ | 100 | 100 | 100 | 100 | 100 | 100 |
| Stabilizer: MPC-S | 10 | 10 | 10 | 10 | 10 | 10 |
| Anti-oxidants: | | | | | | |
| BPA | 1 | 1 | 1 | 1 | 1 | 1 |
| DLTDP | 2 | 2 | 2 | 2 | 2 | 2 |
| Plasticizer: | | | | | | |
| NTM | 50 | 40 | 50 | 50 | 50 | |
| HMP | | | | | | 50 |
| Filler: BaSO$_4$ | 57 | 57 | 60 | 80 | 50 | 60 |
| Flame retardant: Sb$_2$O$_3$ | 3 | 3 | | | | |
| Lubricant: Stearic acid | 0.1 | 0.1 | | | | |

Performance [1]

| Physicals: | | | | | | |
|---|---|---|---|---|---|---|
| Tensile strength, (p.s.i.) orig | 3,377 | 3,927 | 3,327 | 3,023 | 3,385 | 3,270 |
| Percent retention [2] | 82 | 84 | 86 | 82 | 82 | 79 |
| Elongation (percent) orig | 288 | 260 | 247 | 250 | 293 | 242 |
| Percent retention [2] | 64 | 50 | 69 | 65 | 71 | 93 |
| Penetration resistance [3] (min. at 125° C.) | >10 | >10 | >10 | >10 | >8 | >1 |

[1] Tests performed on 20 mil slab specimen.
[2] Retention after aging 7 days at 158° C.
[3] A 350 gram load is applied by means of a 90° wedge top plunger to a 20 mil slab specimen sandwiched between the plunger and a 1/32 inch cylindrical conductor. The length of time in minutes for cut-through is a measure of the penetration resistance of the compound.

TABLE VI.—PVC THERMOPLASTIC FORMULATIONS, p.h.r.

(Comparisons of 1/32" wire insulation with 20 mil molded slab specimens)

|  | XXXVII | XXXVIII | XXXIX | XL | XLI |
|---|---|---|---|---|---|
| Components: | | | | | |
| Resin: | | | | | |
|   i.v.=1.2+ | 100 | 100 | 100 | 100 | |
|   i.v.=1.1-1.2 | | | | | 100 |
| Plasticizer: | | | | | |
|   NTM | 50 | | | | 50 |
|   DPE | | 50 | | 50 | |
|   MMPP | | | 50 | | |
| Stabilizer: MPC-S | 10 | 10 | 10 | 10 | 7 |
| Anti-oxidants: | | | | | |
|   BPA | 1 | 1 | 1 | 1 | 0.25 |
|   DLTDP | 2 | 2 | 2 | | |
| Filler: | | | | | |
|   BaSO$_4$ | 57 | 57 | 57 | 57 | |
|   Anhydrous aluminum silicate | | | | | 7 |
| Flame retardant: Sb$_2$O$_3$ | 3 | 3 | 3 | 3 | |
| Lubricant: Stearic acid | 0.1 | 0.1 | 0.1 | 0.1 | 0.2 |

TABLE VII.—PVC THERMOPLASTIC PERFORMANCE RATINGS (Comparisons of 1/32" wire insulation with 20 mil molded slab specimens)

|  | XXXVII | | XXVIII | XXXIX | | XL | XLI |
|---|---|---|---|---|---|---|---|
|  | Wire[1] | Slab[2] | Wire[1] | Wire[1] | Slab[2] | Wire[2] | Slab[2] |
| Elongation (percent) orig | 300 | 290 | 348 | 292 | 233 | 322 | 310 |
| Percent retention[3] | 76 | 59 | 70 | 71 | 69 | 54 | 40 |
| Penetration resistance[4] (min. at 125° C.) | >10 | >10 | >10 | >10 | >10 | >10 | <1 |
| Deformation at 121° C., percent orig | 71 | | 71 | 74 | | 71 | |
| Insulation (resistance) (megohms/m.-ft.): | | | | | | | |
|   1 day at 25° C | 160 | | 380 | 85 | | 455 | |
|   1 day at 136° C | 46 | | 41 | 27 | | 53 | |
|   7 days at 136° C | 1,100 | | 825 | 975 | | 725 | |

[1] Tests performed on 1/32 inch wire insulation on a No. 20 AWG copper conductor.
[2] Test performed on 20 mil slab specimens.
[3] Retention after aging 7 days at 158° C.
[4] A 350 gram load is applied by means of a 90° wedge tip plunger to either a 20 mil slab specimen sandwiched between the plunger and a 1/32 inch cylindrical conductor: or in the case of a finished wire specimen, the wire is placed under and at right angles to the cutting edge of the plunger. The length of time in minutes for cut-through is a measure of the penetration resistance of the compound.

TABLE VIII.—UNFILLED PVC THERMOPLASTIC FORMULATIONS, p.h.r.

|  | XLII[1] | XLIII[1] | XLIV[2] | XLV[2] | XLVI[2] | XLVII[2] |
|---|---|---|---|---|---|---|
| Compounds: | | | | | | |
| PVC resin: | | | | | | |
|   i.v.=1.3 | 100 | 100 | 100 | 100 | | |
|   i.v.=1.1-1.2 | | | | | 100 | 100 |
| Stabilizer: | | | | | | |
|   MPC-S | 10 | | 10 | | 10 | |
|   MDPT | | | | 10 | | 10 |
|   D-BST | | 4 | | | | |
| Plasticizer: | | | | | | |
|   DPE | | | 50 | 50 | 50 | 50 |
|   MMPP | 50 | 50 | | | | |
| Anti-oxidants: | | | | | | |
|   BPA | 1 | 1 | 0.5 | 0.5 | 0.5 | 0.5 |
|   DLTDP | 2 | 2 | | | | |
| Flame retardant: Sb$_2$O$_3$ | 3 | 3 | | | | |
| Lubricant: Stearic acid | 0.1 | 0.1 | | | | |
| Performance | | | | | | |
| Physicals: | | | | | | |
|   Tensile strength (p.s.i.) orig | 3,598 | 3,560 | 3,800 | 3,650 | 3,150 | 3,440 |
|   Percent retention[3] | 104 | 85 | 80 | 91 | 81 | 70 |
|   Elongation (percent) orig | 208 | 210 | 320 | 275 | 300 | 325 |
|   Percent retention[3] | 79 | 69 | 69 | 92 | 64 | 77 |

[1] Tested as 5 mil slab specimens. [2] Tested as 20 mil slab specimens. [3] Retention after aging 7 days at 158° C.

As pointed out above the complexity of the relationship between the components of a polyvinyl chloride polymer and in particular the plasticizers, stabilizer and fillers used in preparation of the unique plastic material of this invention precludes generalizing with respect to equivalent components or variations in the amounts used. However, the present disclosure is based on an exhaustive study of all likely components in various proportions and the formulations discussed represent those few combinations of components essential to a flexible high temperature i.e. 125° C. PVC thermoplastic insulation. It will be understood however, that because of the empirical nature of the invention some variation in amounts of components used may be expected and are contemplated within the scope of the invention.

The invention may be carried out in other specific ways than those herein set forth without departing from the spirit and essential characteristics of the invention, and the present embodiments are, therefore, to be considered in all respects as illustrative and not restrictive, and changes coming within the meaning and equivalency range of the appended claims are intended to be embraced therein.

We claim:

1. A high temperature polyvinyl chloride thermoplastic composition characterized by resistance to penetration plus retention of elongation and tensile strength at temperatures at least as high as 125° C. comprising a polyvinyl chloride resin having an inherent viscosity of at least 1.1, a low volatile plasticizer having a vapor pressure at least as low as about 0.2 dynes/cm.$^2$ at 160° C. and a stabilizer-filler additive wherein the stabilizer is selected from the group consisting of normal and basic lead compounds, organo-tin compounds, lead-barium and barium cadmium compounds and said filler comprises a Group II-A metal sulfate selected from the group consisting of barium sulfate, strontium sulfate, magnesium sulfate and calcium sulfate, said filler being added in amounts of 40 to 90 parts per hundred parts resin.

2. A high temperature polyvinyl chloride thermoplastic composition according to claim 1 wherein said low volatile plasticizer is added in an amount from 20 to 60 parts, and said stabilizer-filler is added in amounts from 42 to 105 parts all said parts based on 100 parts resin.

3. A high temperature polyvinyl chloride thermoplastic composition according to Claim 2 wherein the stabilizer of said stabilizer-filler additive is barium stearate coated lead chlorosilicate.

4. A high temperature polyvinyl chloride thermoplastic composition according to Claim 2 wherein the stabilizer of said stabilizer-filler additive is barium stearate coated tribasic lead sulfate.

5. A high temperature polyvinyl chloride thermoplastic composition according to Claim 2 wherein the stabilizer of said stabilizer-filler additive is a barium-cadmium complex.

6. A high temperature polyvinyl chloride thermoplastic composition according to Claim 2 wherein the stabilizer of said stabilizer-filler additive is a lead-barium complex.

7. A high temperature polyvinyl chloride thermoplastic composition according to Claim 2 wherein said stabilizer of said stabilizer-filler additive is dibutyl tin bis isooctyl thioglycolate.

8. A high temperature polyvinyl chloride thermoplastic composition according to Claim 1 wherein said plasticizer comprises a mixed normal alkyltrimellitate in an amount of about 40–60 parts, said stabilizer comprises barium stearate coated basic lead chlorosilicate in an amount of about 2–15 parts, said filler comprises barium sulfate, said composition including an anti-oxidant comprising the combination of 2,2¹-bis (4 hydroxy phenyl) propane and dilaurylthiodipropionate in the ratio of 1:2 parts all of said parts based on 100 parts resin.

9. A high temperature polyvinyl chloride thermoplastic composition according to Claim 1 wherein said plasticizer comprises a dipentaerythritol ester in an amount of about 40–60 parts, said stabilizer comprises barium stearate coated basic lead sulfate in an amount of about 2–15 parts, said filler comprises barium sulfate, said composition including an anti-oxidant comprising the combination of 2,2¹-bis (4 hydroxy phenyl) propane and dilauryl- thiodipropionate in a ratio of 1:2 parts, all of said parts being based on 100 parts resin.

References Cited

UNITED STATES PATENTS

| | | | |
|---|---|---|---|
| 3,091,597 | 5/1963 | Henriques | 260—41 |
| 3,346,536 | 10/1967 | Kauder | 260—45.75 R |
| 3,380,956 | 4/1968 | Fletcher et al. | 260—41 |
| 3,417,039 | 12/1968 | Penneck. | |
| 3,228,883 | 1/1966 | Enzo Di Giulio et al. | 260—41 B |
| 3,652,680 | 3/1972 | Buchholz | 260—45.7 S |
| 3,637,587 | 1/1972 | Cyba | 260—45.75 K |
| 3,578,647 | 5/1971 | Gregorian et al. | 260—41 B |
| 3,644,578 | 2/1972 | Mathieu et al. | 260—31.6 |
| 3,645,944 | 2/1972 | White et al. | 260—45.75 R |

OTHER REFERENCES

Chevassus, Fernand, The Stabilization of Polyvinyl Chloride, Edward Arnold Pub., London, 1963, pp. 58, 60, 125, 261, 268, 270, 271, 281, 282.

Sarvetnick, Harold A., Polyvinyl Chloride, Reinhold Co., New York, 1969, pp. 20–21.

Chevassus et al., The Stabilization of Polyvinyl Chloride, 1966, Edward Arnold (Publishers) Ltd., TP 986 V 48 C 45E, 1963, C. 2.

ALLAN LIEBERMAN, Primary Examiner

J. H. Derrington, Assistant Examiner

U.S. Cl. X.R.

117—232; 260—31.6 R, 31.8 R, 41 B, 45.75 R, 45.75 K, 45.85 S, 45.95 R

UNITED STATES PATENT OFFICE
CERTIFICATE OF CORRECTION

Patent No. 3,824,202          Dated July 16, 1974

Inventor(s)     Edward L. White et al.

It is certified that error appears in the above-identified patent and that said Letters Patent are hereby corrected as shown below:

In the grant (only) insert columns 13, 14, 15 and 16, as shown on the attached sheets.

Signed and sealed this 22nd day of October 1974.

(SEAL)
Attest:

McCOY M. GIBSON JR.          C. MARSHALL DANN
Attesting Officer             Commissioner of Patents

TABLE VI.—PVC THERMOPLASTIC FORMULATIONS, p.h.r.

(Comparisons of 1/32" wire insulation with 20 mil molded slab specimens)

| Components: | XXXVII | XXXVIII | XXXIX | XL | XLI |
|---|---|---|---|---|---|
| Resin: | | | | | |
| i.v.=1.2+ | 100 | 100 | 100 | 100 | |
| i.v.=1.1–1.2 | | | | | 100 |
| Plasticizer: | | | | | |
| NTM | 50 | | | | 50 |
| DPE | | 50 | | 50 | |
| MMPP | | | 50 | | |
| Stabilizer: MPC-S | 10 | 10 | 10 | 10 | 7 |
| Anti-oxidants: | | | | | |
| BPA | 1 | 1 | 1 | 1 | 0.25 |
| DLTDP | 2 | 2 | 2 | | |
| Filler: | | | | | |
| BaSO₄ | 57 | 57 | 57 | 57 | |
| Anhydrous aluminum silicate | | | | | 7 |
| Flame retardant: Sb₂O₃ | 3 | 3 | 3 | 3 | |
| Lubricant: Stearic acid | 0.1 | 0.1 | 0.1 | 0.1 | 0.2 |

TABLE VII.—PVC THERMOPLASTIC PERFORMANCE RATINGS (Comparisons of 1/32" wire insulation with 20 mil molded slab specimens)

| | XXXVII | | XXVIII | XXXIX | | XL | XLI |
|---|---|---|---|---|---|---|---|
| | Wire[1] | Slab[2] | Wire[1] | Wire[1] | Slab[2] | Wire[2] | Slab[2] |
| Elongation (percent) orig. | 300 | 290 | 348 | 292 | 233 | 322 | 310 |
| Percent retention[3] | 76 | 59 | 70 | 71 | 69 | 54 | 40 |
| Penetration resistance[4] (min. at 125° C.) | >10 | >10 | >10 | >10 | >10 | >10 | <1 |
| Deformation at 121° C., percent orig. | 71 | | 71 | 74 | | 71 | |
| Insulation (resistance) (megohms/m.-ft.): | | | | | | | |
| 1 day at 25° C. | 160 | | 380 | 85 | | 455 | |
| 1 day at 136° C. | 46 | | 41 | 27 | | 53 | |
| 7 days at 136° C. | 1,100 | | 825 | 975 | | 725 | |

[1] Tests performed on 1/32 inch wire insulation on a No. 20 AWG copper conductor.
[2] Test performed on 20 mil slab specimens.
[3] Retention after aging 7 days at 158° C.
[4] A 350 gram load is applied by means of a 90° wedge tip plunger to either a 20 mil slab specimen sandwiched between the plunger and a 1/32 inch cylindrical conductor; or in the case of a finished wire specimen, the wire is placed under and at right angles to the cutting edge of the plunger. The length of time in minutes for cut-through is a measure of the penetration resistance of the compound.

TABLE VIII.—UNFILLED PVC THERMOPLASTIC FORMULATIONS, p.h.r.

| Compounds: | XLII[1] | XLIII[1] | XLIV[2] | XLV[2] | XLVI[2] | XLVII[2] |
|---|---|---|---|---|---|---|
| PVC resin: | | | | | | |
| i.v.=1.3 | 100 | 100 | 100 | 100 | | |
| i.v.=1.1–1.2 | | | | | 100 | 100 |
| Stabilizer: | | | | | | |
| MPC-S | 10 | | 10 | | 10 | |
| MDPT | | | | 10 | | 10 |
| D-BST | | 4 | | | | |
| Plasticizer: | | | | | | |
| DPE | | | 50 | 50 | 50 | 50 |
| MMPP | 50 | 50 | | | | |
| Anti-oxidants: | | | | | | |
| BPA | 1 | 1 | 0.5 | 0.5 | 0.5 | 0.5 |
| DLTDP | 2 | 2 | | | | |
| Flame retardant: Sb₂O₃ | 3 | 3 | | | | |
| Lubricant: Stearic acid | 0.1 | 0.1 | | | | |
| Performance | | | | | | |
| Physicals: | | | | | | |
| Tensile strength (p.s.i.) orig. | 3,598 | 3,560 | 3,800 | 3,650 | 3,150 | 3,440 |
| Percent retention[3] | 104 | 85 | 80 | 91 | 81 | 70 |
| Elongation (percent) orig. | 208 | 210 | 320 | 275 | 300 | 325 |
| Percent retention[3] | 79 | 69 | 69 | 92 | 64 | 77 |

[1] Tested as 5 mil slab specimens. [2] Tested as 20 mil slab specimens. [3] Retention after aging 7 days at 158° C.

As pointed out above the complexity of the relationship between the components of a polyvinyl chloride polymer and in particular the plasticizers, stabilizer and fillers used in preparation of the unique plastic material of this invention precludes generalizing with respect to equivalent components or variations in the amounts used. However, the present disclosure is based on an exhaustive study of all likely components in various proportions and the formulations discussed represent those few combinations of components essential to a flexible high temperature i.e. 125° C. PVC thermoplastic insulation. It will be understood however, that because of the empirical nature of the invention some variation in amounts of components used may be expected and are contemplated within the scope of the invention.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A high temperature polyvinyl chloride thermoplastic composition characterized by resistance to penetration plus retention of elongation and tensile strength at temperatures at least as high as 125° C. comprising a polyvinyl chloride resin having an inherent viscosity of at least 1.1 a low volatile plasticizer having a vapor pressure at least as low as about 0.2 dynes/cm.² at 160° C. and a stabilizer filler additive wherein the stabilizer is selected from the group consisting of normal and basic lead compounds organo-tin compounds, lead-barium and barium cadmium compounds and said filler comprises a Group II-A metal sulfate selected from the group consisting of barium sulfate, strontium sulfate, magnesium sulfate and calcium sulfate, said filler being added in amounts of 40 to 9 parts per hundred parts resin.

2. A high temperature polyvinyl chloride thermoplastic composition according to claim 1 wherein said low volatile plasticizer is added in an amount from 20 to 60 parts and said stabilizer-filler is added in amounts from 42 to 105 parts all said parts based on 100 parts resin.

3. A high temperature polyvinyl chloride thermoplastic composition according to Claim 2 wherein the stabilizer of said stabilizer-filler additive is barium stearate coated lead chlorosilicate.

4. A high temperature polyvinyl chloride thermoplastic composition according to Claim 2 wherein the stabilizer of said stabilizer-filler additive is barium stearate coated tribasic lead sulfate.

5. A high temperature polyvinyl chloride thermoplastic composition according to Claim 2 wherein the stabilizer of said stabilizer-filler additive is a barium-cadmium complex.

6. A high temperature polyvinyl chloride thermoplastic composition according to Claim 2 wherein the stabilizer of said stabilizer-filler additive is a lead-barium complex.

7. A high temperature polyvinyl chloride thermoplastic composition according to Claim 2 wherein said stabilizer of said stabilizer-filler additive is dibutyl tin bis isooctyl thioglycolate.

8. A high temperature polyvinyl chloride thermoplastic composition according to Claim 1 wherein said plasticizer comprises a mixed normal alkyltrimellitate in an amount of about 40-60 parts, said stabilizer comprises barium stearate coated basic lead chlorosilicate in an amount of about 2-15 parts, said filler comprises barium sulfate, said composition including an anti-oxidant comprising the combination of 2,2¹-bis (4 hydroxy phenyl) propane and dilaurylthiodipropionate in the ratio of 1:2 parts all of said parts based on 100 parts resin.

9. A high temperature polyvinyl chloride thermoplastic composition according to Claim 1 wherein said plasticizer comprises a dipentaerythritol ester in an amount of about 40-60 parts, said stabilizer comprises barium stearate coated basic lead sulfate in an amount of about 2-15 parts, said filler comprises barium sulfate, said composition including an anti-oxidant comprising the combination of 2,2¹-bis (4 hydroxy phenyl) propane and dilauryl- thiodipropionate in a ratio of 1:2 parts, all of said parts being based on 100 parts resin.

References Cited

UNITED STATES PATENTS

| | | | |
|---|---|---|---|
| 3,091,597 | 5/1963 | Henriques | 260—41 |
| 3,346,536 | 10/1967 | Kauder | 260—45.75 R |
| 3,380,956 | 4/1968 | Fletcher et al. | 260—41 |
| 3,417,039 | 12/1968 | Penneck. | |
| 3,228,883 | 1/1966 | Enzo Di Giulio et al. | 260—41 B |
| 3,652,680 | 3/1972 | Buchholz | 260—45.7 S |
| 3,637,587 | 1/1972 | Cyba | 260—45.75 K |
| 3,578,647 | 5/1971 | Gregorian et al. | 260—41 B |
| 3,644,578 | 2/1972 | Mathieu et al. | 260—31.6 |
| 3,645,944 | 2/1972 | White et al. | 260—45.75 R |

OTHER REFERENCES

Chevassus, Fernand, The Stabilization of Polyvinyl Chloride, Edward Arnold Pub., London, 1963, pp. 58, 60, 125, 261, 268, 270, 271, 281, 282.

Sarvetnick, Harold A., Polyvinyl Chloride, Reinhold Co., New York, 1969, pp. 20-21.

Chevassus et al., The Stabilization of Polyvinyl Chloride, 1966, Edward Arnold (Publishers) Ltd., TP 986 V 48 C 45E, 1963, C. 2.

ALLAN LIEBERMAN, Primary Examiner

J. H. Derrington, Assistant Examiner

U.S. Cl. X.R.

117—232; 260—31.6 R, 31.8 R, 41 B, 45.75 R, 45.75 K, 45.85 S, 45.95 R